(12) United States Patent
Bledsoe et al.

(10) Patent No.: US 8,542,412 B2
(45) Date of Patent: Sep. 24, 2013

(54) TWO-DIMENSIONAL CMOS SENSOR ARRAY TO IMAGE DOCUMENTS AND OTHER FLAT OBJECTS

(75) Inventors: J. Daren Bledsoe, Albany, OR (US); Gregory F. Carlson, Corvallis, OR (US); Todd A. McClelland, Corvallis, OR (US); Patrick A. McKinley, Corvallis, OR (US)

(73) Assignee: Marvell International Technology Ltd. (BM)

( * ) Notice: Subject to any disclaimer, the term of this patent is extended or adjusted under 35 U.S.C. 154(b) by 249 days.

(21) Appl. No.: 12/502,053

(22) Filed: Jul. 13, 2009

(65) Prior Publication Data

US 2009/0273817 A1     Nov. 5, 2009

Related U.S. Application Data

(62) Division of application No. 10/821,821, filed on Apr. 8, 2004, now abandoned.

(51) Int. Cl.
*H04N 1/04*     (2006.01)

(52) U.S. Cl.
USPC ........................................... 358/474; 358/471

(58) Field of Classification Search
None
See application file for complete search history.

(56) References Cited

U.S. PATENT DOCUMENTS

| | | | |
|---|---|---|---|
| RE29,067 E | 12/1976 | Watson | |
| 4,723,120 A | 2/1988 | Petty, Jr. | |
| 4,865,038 A | 9/1989 | Rich et al. | |
| 5,377,022 A * | 12/1994 | Street et al. | 358/498 |
| 5,734,178 A | 3/1998 | Sekine | |
| 5,734,483 A | 3/1998 | Itoh | |
| 5,790,281 A * | 8/1998 | Knox et al. | 358/504 |
| 6,394,349 B1 | 5/2002 | Shigekusa et al. | |
| 6,639,697 B1 | 10/2003 | Geer | |
| 6,747,764 B1 * | 6/2004 | Chu | 358/474 |
| 6,888,083 B2 | 5/2005 | Hergeth | |
| 6,943,922 B2 | 9/2005 | Yamamoto et al. | |
| 7,042,599 B2 * | 5/2006 | Yokota et al. | 358/475 |
| 7,233,419 B2 * | 6/2007 | Chang | 358/475 |
| 7,333,250 B2 | 2/2008 | Spears et al. | |
| 2003/0001076 A1 | 1/2003 | Brandenberger et al. | |
| 2003/0063333 A1 | 4/2003 | Boll | |

FOREIGN PATENT DOCUMENTS

| | | |
|---|---|---|
| EP | 1 221 809 | 7/2002 |
| JP | 57-067461 | 10/1955 |
| JP | 59-009673 | 1/1984 |
| JP | 60-055158 | 4/1985 |

(Continued)

OTHER PUBLICATIONS

Jeff Tyson, "How Scanners Work", Howstuffworks Internet article, downloaded on Feb. 21, 2004 from http://computer.howstuffworks.com/scanner.htm/printable, 11 pages.

(Continued)

*Primary Examiner* — Twyler Haskins
*Assistant Examiner* — Lennin RodriguezGonzalez

(57) ABSTRACT

A flatbed scanner includes a housing, a transparent platen atop the housing for receiving an object to be scanned, and a carriage operable to travel along a horizontal direction and a vertical direction. The carriage includes a light source for illuminating the object and a rectangular photodetector array for simultaneously detecting light intensity of multiple scan lines.

20 Claims, 4 Drawing Sheets

(56) References Cited

FOREIGN PATENT DOCUMENTS

| | | |
|---|---|---|
| JP | 62-171250 | 10/1987 |
| JP | S63-299457 | 12/1988 |
| JP | 02-007768 | 1/1990 |
| JP | 03-132638 | 6/1991 |
| JP | 04-046458 | 2/1992 |
| JP | H4-107054 | 4/1992 |
| JP | 04-192659 | 7/1992 |
| JP | 05-057558 | 3/1993 |
| JP | 05-344290 | 12/1993 |
| JP | 06-014154 | 1/1994 |
| JP | 6-14154 | 1/1994 |
| JP | 09-163092 | 6/1997 |
| JP | 09-238232 | 9/1997 |
| JP | 09-181884 | 11/1997 |
| JP | 11-331510 | 11/1999 |
| JP | 2000-115468 | 4/2000 |
| JP | 2000-216953 | 8/2000 |
| JP | 2001-036697 | 2/2001 |
| JP | 200136697 A | 2/2001 |
| JP | 2001-217994 | 8/2001 |
| JP | 2002-199189 | 7/2002 |
| JP | 2002-330336 | 11/2002 |
| JP | 2003-309718 | 10/2003 |
| JP | 2004-088408 | 3/2004 |
| JP | 2004186734 A | 7/2004 |

OTHER PUBLICATIONS

Translation of an Office Action in the German Patent Office, dated Jun. 11, 2008, for corresponding German application No. 10 2005 004 393.3.

Organized Translation of "Notice of Reasons for Rejection", dated Mar. 24, 2009, for corresponding Japan application No. 2005-108389.

Office Action issued in corresponding Japanese Appln. No. 2009-192506 dated Jun. 16, 2012 (3 pgs).

Office Action issued in corresponding Japanese Appln. No. 2011-088350 on Mar. 26, 2013 (6 pages).

Office Action issued in corresponding Japanese Appln. No. 2009-192506 on Oct. 16, 2012 (2 pages).

\* cited by examiner

TWO-DIMENSIONAL CMOS SENSOR ARRAY TO IMAGE DOCUMENTS AND OTHER FLAT OBJECTS

RELATED APPLICATION

This application is a divisional application of commonly-assigned U.S. patent application Ser. No. 10/821,821, filed Apr. 8, 2004, entitled "TWO-DIMENSIONAL CMOS SENSOR ARRAY TO IMAGE DOCUMENTS AND OTHER FLAT OBJECTS," hereby incorporated by reference in its entirety.

DESCRIPTION OF RELATED ART

When using a conventional flatbed scanner, the document is placed on the glass platen and the cover is closed. A light source (e.g., cold cathode fluorescent lamp, a xenon lamp, or light emitting diodes) is used to illuminate the document. A scan head (e.g., consisting of mirrors, lens, filter, and image sensor array) is moved slowly down the document (e.g., by a belt that is attached to a stepper motor or a gear set linked to a DC motor). The scan head is attached to a stabilizer bar to ensure that there is no wobble or deviation in the pass (i.e., a single complete scan of the document).

The image of the document is reflected by angled mirrors to form a folded light path. The last mirror reflects the image onto a lens. The lens focuses the image on an image sensor. A typical charged coupled device (CCD) image sensor has 3 linear CCD sensor arrays. Each linear array has a different color filter (e.g., red, green, and blue) placed directly on top of the CCD sensors. The scanner then combines the data from the linear CCD sensor arrays into a single full-color image. In comparison, a typical contact image sensor (CIS) has one linear complementary metal oxide semiconductor (CMOS) sensor array that captures an image sequentially illuminated by red, green, and blue light sources (e.g., light emitting diodes). The scanner then combines the data from the linear CMOS sensor array into a single full-color image.

Scanners vary in resolution and sharpness. Most flatbed scanners have a true hardware resolution of at least 600×600 dots per inch (dpi). The scanner's dpi is determined by the number of sensors in a single row (x-direction sampling rate) of the sensor array and by the precision of the stepper motor (y-direction sampling rate). For example, if the resolution is 600×600 dpi and the scanner is capable of scanning a letter-sized document, then the CCD image sensor would have three linear arrays each having 5,100 sensors while a CIS would have one linear array of 5,100 sensors. The stepper motor in this example is able to move in increments equal to ⅙₀₀ths of an inch.

SUMMARY

In one embodiment of the invention, a scanner includes a housing, a transparent platen atop the housing for receiving an object to be scanned, and a carriage operable to travel along a horizontal direction and a vertical direction. The carriage includes a light source for illuminating the object and a rectangular photodetector array for simultaneously detecting light intensity of multiple scan lines.

BRIEF DESCRIPTION OF THE DRAWINGS

Use of the same reference numbers in different figures indicates similar or identical elements.

DETAILED DESCRIPTION

Figure 1:
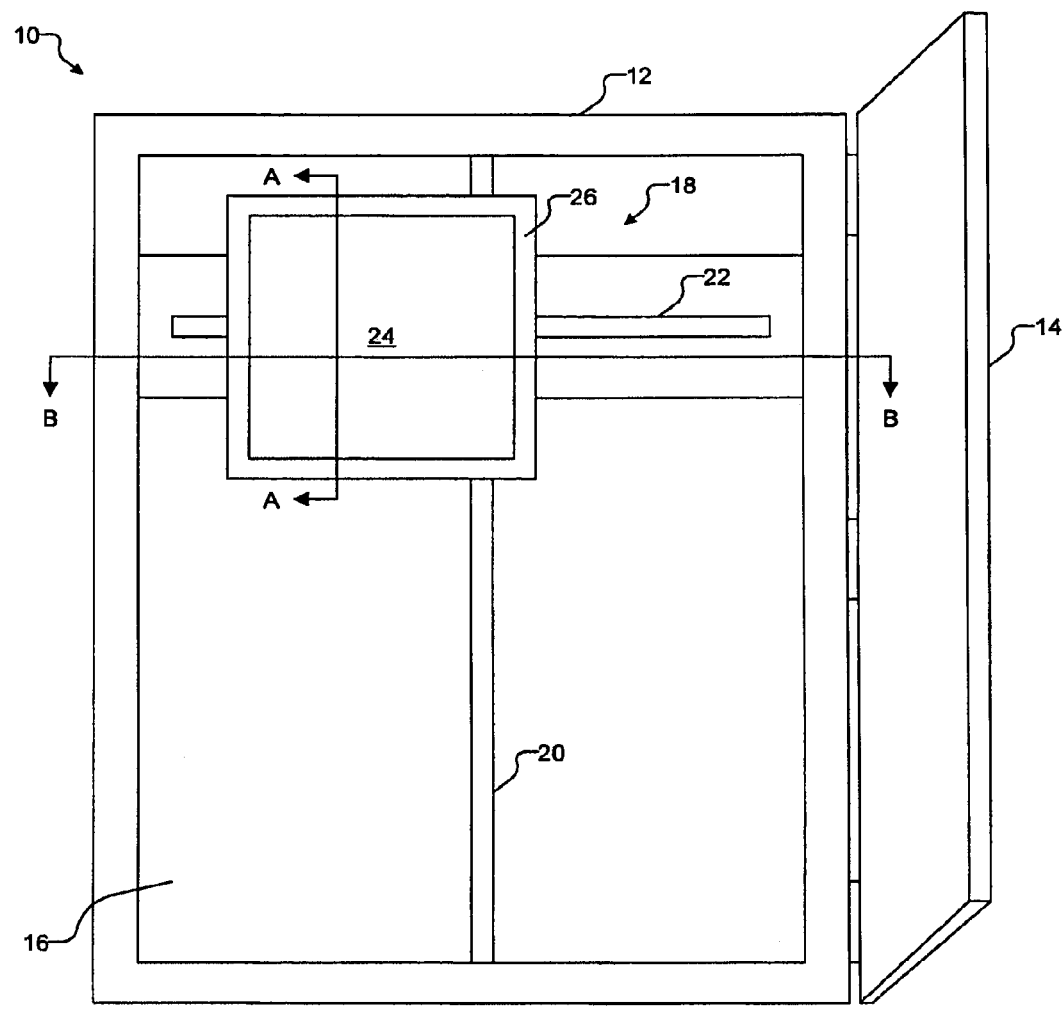
FIG. 1 illustrates a top view of a flatbed scanner in one embodiment of the invention.

FIG. 1 illustrates a flatbed scanner 10 in one embodiment of the invention. Scanner 10 includes a housing 12, a cover 14 hingedly attached to housing 12, a transparent (e.g., glass) platen 16 atop housing 12, and a carriage 18 within housing 12. Carriage 18 travels within housing 12 on a vertical gear channel 20 and a horizontal gear channel 22. Carriage 18 includes a rectangular photodetector array 24 and an illumination ring 26.

In one embodiment, photodetector array 24 has multiple (e.g., more than three) rows of complementary metal oxide semiconductor (CMOS) sensors. In one embodiment, photodetector array 24 consists of a variety of red, blue, and green photodiodes and the actual color at the site of each photodiode is interpolated from the colors of the neighboring photodiodes. In a lower-end scanner with a slower throughput, photodetector array 24 may have a resolution of 352×288 pixels. In a higher-end scanner with a faster throughput, photodetector array 24 may have 1.3 megapixel of resolution to enable the entire page to be scanned more quickly. In one embodiment, illumination ring 26 are light emitting diodes (LEDs) formed around photodetector array 24 on the same die.

Figure 2:
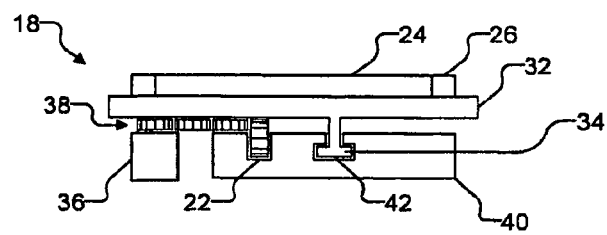
FIGS. 2 and 3 illustrate cross-sectional side views of the flatbed scanner of FIG. 1 in one embodiment of the invention.

FIG. 2 illustrates a cross-section view of carriage 18 along line A (FIG. 1) in one embodiment of the invention. Photodetector array 24 and illumination ring 26 are mounted on a plate 32. Mounting plate 32 includes a horizontal guide 34. A motor 36 and associated gear system 38 are mounted to plate 32. A horizontal carriage bar 40 defines a horizontal guide channel 42 that receives guide 34. Horizontal carriage bar 40 further defines gear channel 22 that receives a gear from gear system 38. Gear channel 22 includes teeth that engage gear system 38. In operation, motor 36 drives gear system 38 to move carriage 18 horizontally across the object to be scanned. A flex cable 50 (FIG. 3) moves the image data from photodetector array 24 to horizontal carriage bar 40.

Figure 3:
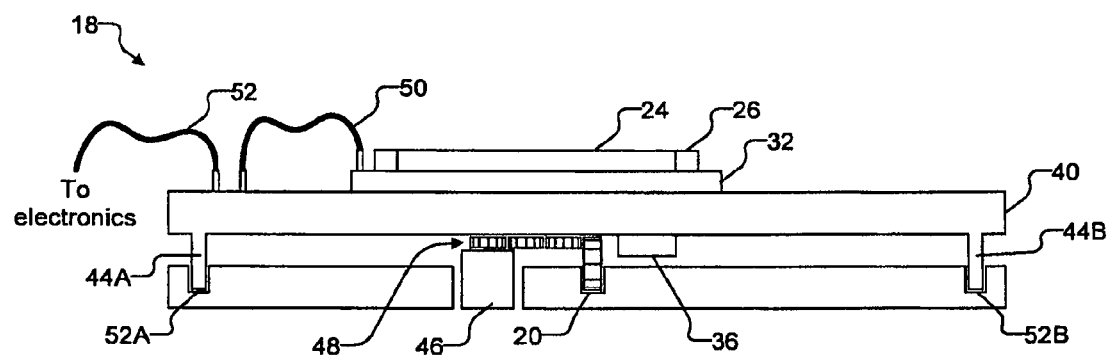

FIG. 3 illustrates a cross-section view of carriage 18 along line B (FIG. 1) in one embodiment of the invention. Horizontal carriage bar 40 includes vertical guides 44A and 44B. A motor 46 and associated gear system 48 are mounted to horizontal carriage bar 40. Housing 12 defines vertical guide channels 52A and 52B that receive corresponding guides 44A and 44B. Housing 12 further defines gear channel 20 that receives a gear from gear system 48. Gear channel 20 includes teeth that engage gear system 48. In operation, motor 46 drives gear system 48 to move carriage 18 vertically down the object to be scanned. A flex cable 52 moves the image data from horizontal carriage bar 40 to the scanner base for the data to be processed by the scanner electronics.

Figure 4:
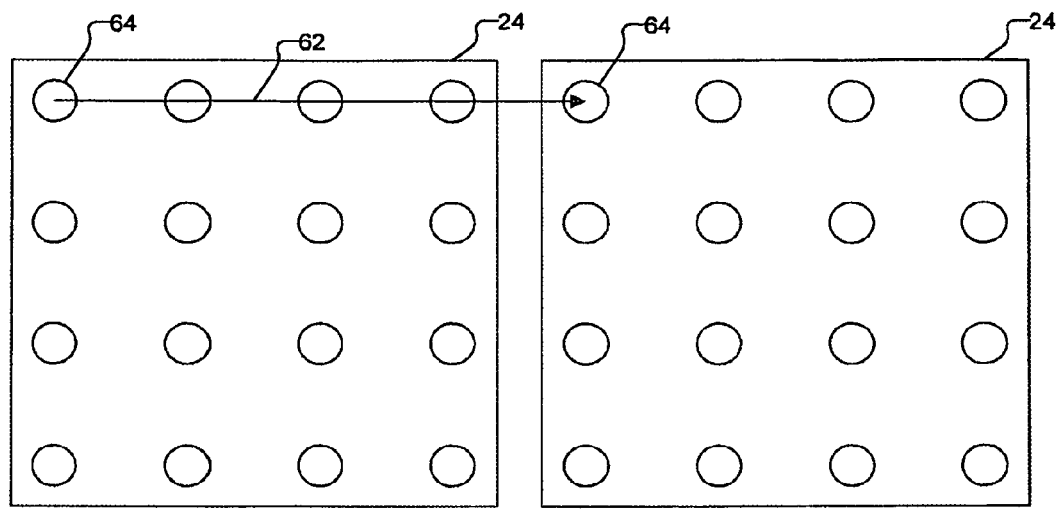
FIGS. 4 and 5 illustrate movement of a rectangular photodetector array in embodiments of the invention.

During scanning, the object to be scanned is placed on glass platen 16. Illumination ring 26 then illuminates a portion of the object. Light is reflected from this portion of the object and simultaneously captured as multiple (e.g., more than three) scan lines by rectangular photodetector array 24. Photodetector array 24 converts the light intensity of this portion into electrical signals. FIG. 4 illustrates that, instead of slowly moving scan line by scan line as in conventional flatbed scanners, carriage 18 moves horizontally or vertically in large increments (e.g., exemplified by a movement 62 of sensor 64) equal to or greater than the corresponding width and height of photodetector array 24 in one embodiment of the invention. This allows for a faster scanning process. After the entire object is scanned, software is used to interpolate pixel colors and to stitch together the scanned portions into a single color image of the object. Software can also be used to correct any non-uniform lighting.

Figure 5:
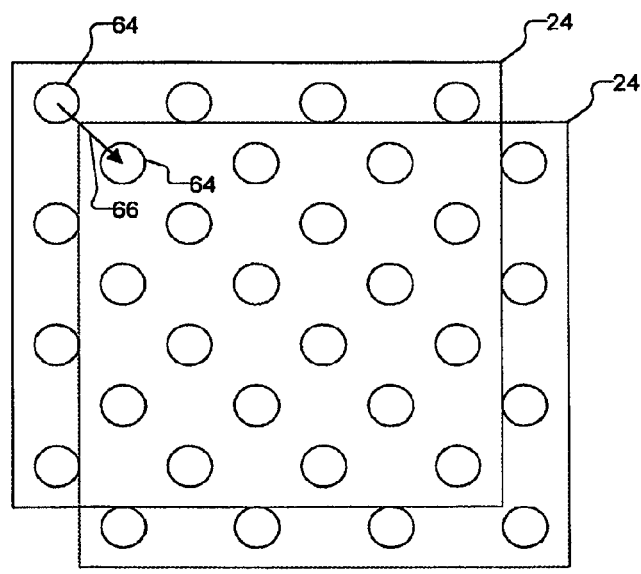

FIG. 5 illustrates that the resolution can be increased by micro-stepping rectangular photodetector array 24 both horizontally and vertically in small increments (e.g., exemplified by a movement 66 of sensor 64) in one embodiment of the invention. The horizontal increment is less than the horizontal spacing between adjacent sensors while the vertical increment is less than the vertical spacing between adjacent sensors. For example, if photodetector array 24 produces 300× 300 dpi, then the resolution can be doubled to 600×600 dpi by (1) capturing an image of the object, (2) moving photodetector array 24 by half (½) a dpi in the horizontal and the vertical directions, and (3) capturing another image of the object. Software is then used to combine the two images to form a 600×600 dpi image of the object. After a micro-step, carriage 18 can move horizontally or vertically in a large increment to scan the next area on the object, followed by another microstep.

Figure 6:
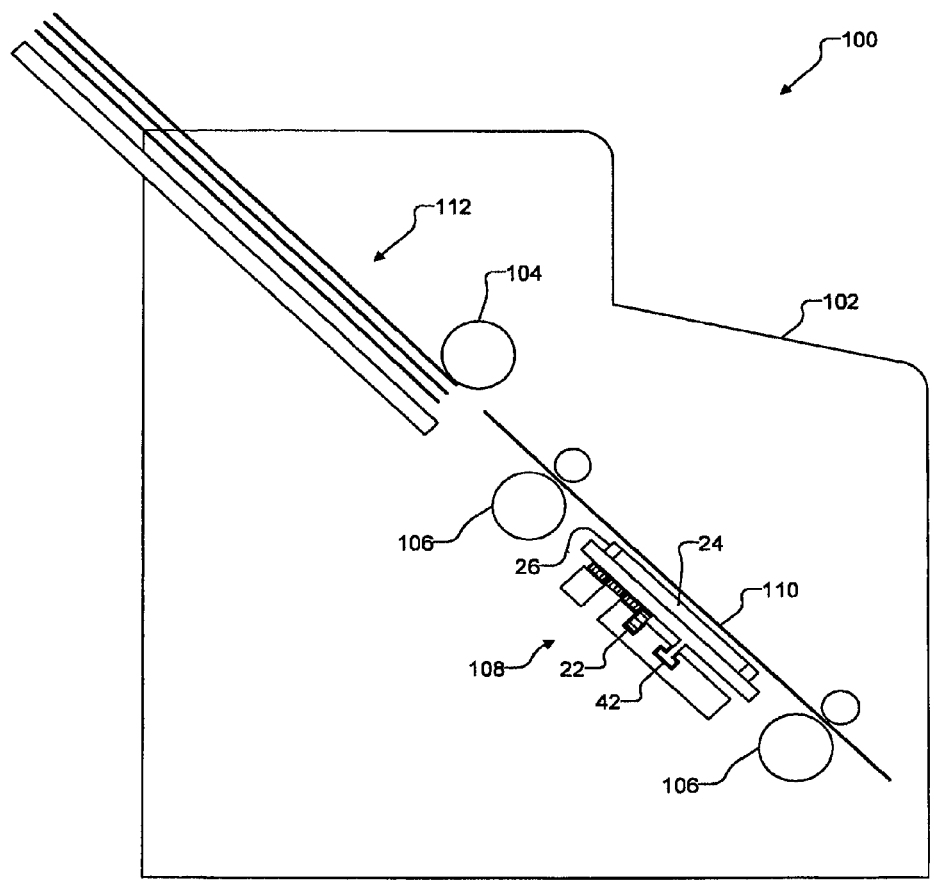
FIG. 6 illustrates a cross-sectional side view of a sheet feeder scanner in one embodiment of the invention.

FIG. 6 illustrates a side cross-sectional view of a sheet feeder scanner 100 in one embodiment of the invention. Scanner 100 includes a housing 102, a sheet feeder 104, feed rollers 106, and a carriage 108 within housing 102. Sheet feeder 104 grabs a single sheet 110 of document from a stack 112 and moves it vertically to feed rollers 106. Feed rollers 106 move sheet 110 past carriage 108. Carriage 108 includes rectangular photodetector array 24 and illumination ring 26. To scan sheet 110, carriage 108 travels horizontally within housing 102 on horizontal gear channel 22 and horizontal guide channel 42. Carriage 108 is similar to carriage 18 but without the vertical travel components because feed rollers 106 function to move the paper vertically past carriage 108. Instead of moving the paper slowly scan line by scan line as in conventional sheet feeder scanners, feed rollers 106 vertically move single sheet 110 in large increments equal to or greater than the height of photodetector array 24. Again, this allows for a faster scanning process because portions of the documents are simultaneously captured as multiple scan lines by rectangular photodetector array 24.

Figure 7:
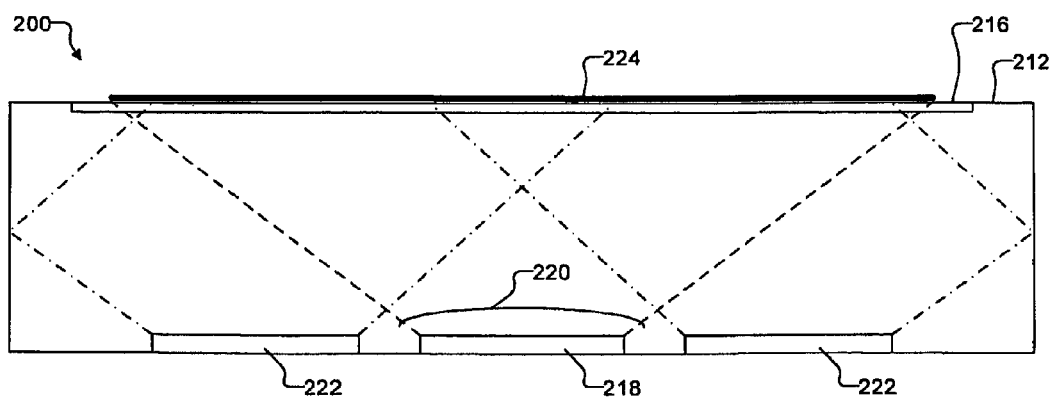
FIG. 7 illustrates a cross-sectional side view of a flatbed scanner in one embodiment of the invention.

FIG. 7 illustrates a side cross-sectional view of a flatbed scanner 200 in one embodiment of the invention. Scanner 200 includes a housing 212, a glass platen 216 atop housing 212, a stationary rectangular photodetector array 218 with optics 220, and light sources 222.

During scanning, the object to be scanned (e.g., object 224) is placed on glass platen 16. Light sources 222 then illuminates the entire object by directing light onto object 224 or bouncing light off the sidewalls of housing 212 and then onto object 224. Light is reflected from object 224 and directed by optics 220 onto rectangular photodetector array 218. Photodetector array 218 converts the light intensity of the scanned object into electrical signals. Instead of moving a carriage as in conventional scanners, photodetector array 218 remains stationary and scans the entire object at once. Again, this allows for a faster scanning process because multiple scan lines are captured simultaneously by photodetector array 218. Software can be used to interpolate pixel colors and to correct any non-uniform lighting.

Various other adaptations and combinations of features of the embodiments disclosed are within the scope of the invention. Numerous embodiments are encompassed by the following claims.

What is claimed is:

1. A flatbed scanner, comprising:
a housing;
a transparent platen atop the housing comprising an area for imaging, the area for imaging receiving an object to be scanned;
a first stationary lighting source and a second stationary lighting source housed within the housing and fixed relative to the transparent platen, wherein the first stationary lighting source is configured to generate light that overlaps light generated from the second stationary lighting source to illuminate the area for imaging;
a stationary photodetector array housed within the housing and fixed relative to the transparent platen, wherein the first and second stationary lighting sources are fixed on opposing sides of the stationary photodetector array; and
optics that direct light reflected from the entire object to the stationary photodetector array;
wherein the optics and stationary photodetector array are configured to receive the reflected light from the entire object at once in order to image the entire object simultaneously;
wherein both the first stationary lighting source and the second stationary lighting source are configured to remain stationary throughout a duration of the optics and the stationary photodetector receiving the reflected light in order to image the entire object; and
wherein the first stationary lighting source and the second stationary lighting source are configured to face the transparent platen such that a plane defined by the first stationary light source and the second stationary light source is parallel to a plane defined by the transparent platen.

2. The flatbed scanner of claim 1 wherein the first stationary lighting source and the second stationary lighting source are configured to illuminate at least a part of the area for imaging with non-uniform lighting.

3. The flatbed scanner of claim 1 wherein the electronics are further configured to interpolate pixel colors in the received reflected light.

4. The flatbed scanner of claim 1 wherein the housing comprises a sidewall, and wherein the plurality of light sources directs light to the sidewall to bounce light off the sidewall and onto the object.

5. The flatbed scanner of claim 1 wherein the stationary photodetector array comprises more than three rows of photodetectors.

6. The flatbed scanner of claim 1 wherein the first stationary lighting source, the second stationary lighting source, and the stationary photodetector array are substantially co-planar.

7. A flatbed scanner comprising:
a housing;
a transparent platen;
a plurality of stationary light sources configured within the housing to illuminate the transparent platen, wherein light from each of the plurality of stationary light sources overlap at least a part of the transparent platen; and
a stationary photodetector array to receive light reflected off of an object on the transparent platen;
wherein the plurality of stationary lighting sources are fixed surrounding the stationary photodetector array;

wherein the plurality of stationary light sources and the stationary photodetector array are fixed relative to the transparent platen;

wherein the plurality of stationary lighting sources are configured to remain stationary throughout a duration the stationary photodetector array receiving the light reflected off the object; and wherein the plurality of stationary lighting sources are configured to face the transparent platen such that a plane defined by the plurality of lighting sources is parallel to a plane defined by the transparent platen.

8. The flatbed scanner of claim 7 wherein the housing includes a sidewall to reflect light from at least one of the plurality of stationary light sources to the transparent platen.

9. The flatbed scanner of claim 7 wherein the plurality of stationary light sources illuminate the transparent platen with non-uniform lighting.

10. The flatbed scanner of claim 7 wherein the electronics are further configured to interpolate pixel colors in the received light.

11. The flatbed scanner of claim 7 wherein the plurality of stationary light sources and the stationary photodetector array are substantially co-planar.

12. The flatbed scanner of claim 7 further comprising optics that direct light reflected off of the object on the transparent platen to the stationary photodetector array.

13. The flatbed scanner of claim 1, wherein the first and second stationary lighting sources in the stationary photodetector array are in a same plane, wherein the plane is perpendicular to the light from the first stationary lighting source and the light from the second stationary lighting source.

14. A method of scanning an image in a flatbed scanner, the method comprising:

receiving an object to be scanned in an area for imaging of a transparent platen atop a housing;

illuminating the area for imaging using first and second stationary lighting sources housed within the housing and fixed relative to the transparent platen;

directing light reflected from the object to a stationary photodetector array; and receiving the light at a stationary photodetector array housed within the housing and fixed relative to the transparent platen, wherein the first and second stationary lighting sources are fixed on opposing sides of the stationary photodetector array with the stationary photodetector array positioned between the first and second stationary lighting sources, and wherein light from the first stationary lighting source overlaps light from the second stationary lighting source 4 at least a portion of the transparent platen; and wherein the first stationary lighting source and the second stationary lighting source are configured to remain stationary throughout a duration of the stationary photodetector array receiving the light reflected from the object; and wherein the first stationary lighting source and the second stationary lighting source are configured to face the transparent platen such that a plane defined by the first stationary light source and the second stationary light source is parallel to a plane defined by the transparent platen.

15. The flatbed scanner of claim 1, wherein the light from the first stationary lighting source and the light from the second stationary light are non-uniform lighting and software corrects for the non-uniform lighting.

16. The flatbed scanner of claim 7, wherein light from the plurality of stationary light sources are non-uniform lighting and software corrects for the non-uniform lighting.

17. The method of claim 14, wherein the light from the first stationary lighting source and the light from the second stationary light are non-uniform lighting and software corrects for the non-uniform lighting.

18. The flatbed scanner of claim 1, wherein the first stationary lighting source is configured to direct light to a first illumination region and a second illumination region on the transparent platen;

wherein the second stationary lighting source is configured to direct light to the first illumination region but not to the second illumination region; and wherein the first illumination region is adjacent to the second illumination region.

19. The flatbed scanner of claim 7, wherein a first stationary lighting source of the plurality of stationary lighting sources is configured to direct light to a first illumination region and a second illumination region on the transparent platen;

wherein a second stationary lighting source of the plurality of stationary lighting sources is configured to direct light to the first illumination region but not to the second illumination region; and wherein the first illumination region is adjacent to the second illumination region.

20. The method of claim 14, wherein illuminating the area for imaging using the first and second stationary lighting sources comprises:

directing light from the first stationary lighting source to a first illumination region and a second illumination region on the transparent platen;

directing light from the second stationary lighting source to the first illumination region but not to the second illumination region; and wherein the first illumination region is adjacent to the second illumination region.

* * * * *